United States Patent
Bjerkestrand

(10) Patent No.: US 7,852,455 B2
(45) Date of Patent: Dec. 14, 2010

(54) DEVICE FOR RECORDING FULL PICTURE FRAMES ONTO A PHOTOSENSITIVE MATERIAL

(76) Inventor: Rune Bjerkestrand, Gamle Kongevei 135, N-3040 Drammen (NO)

(*) Notice: Subject to any disclaimer, the term of this patent is extended or adjusted under 35 U.S.C. 154(b) by 800 days.

(21) Appl. No.: 10/579,231

(22) PCT Filed: Nov. 12, 2004

(86) PCT No.: PCT/NO2004/000346
§ 371 (c)(1), (2), (4) Date: Mar. 29, 2007

(87) PCT Pub. No.: WO2005/048597
PCT Pub. Date: May 26, 2005

(65) Prior Publication Data
US 2007/0171373 A1     Jul. 26, 2007

Related U.S. Application Data

(60) Provisional application No. 60/519,264, filed on Nov. 13, 2003.

(30) Foreign Application Priority Data
Nov. 13, 2003    (NO) .................................. 20035046

(51) Int. Cl.
*G03B 31/00*    (2006.01)
(52) U.S. Cl. .............................. 352/6; 352/12; 352/26; 352/55; 352/92
(58) Field of Classification Search .................. 352/5, 352/6, 8, 12, 22, 55, 11, 26, 27, 28, 92
See application file for complete search history.

(56) References Cited

U.S. PATENT DOCUMENTS

| | | | | | |
|---|---|---|---|---|---|
| 3,591,266 | A | * | 7/1971 | Ried | 352/27 |
| 3,932,032 | A | * | 1/1976 | Weinstein | 352/11 |
| 4,129,363 | A | * | 12/1978 | Komine | 352/29 |
| 4,134,648 | A | * | 1/1979 | Shimizu | 352/27 |
| 4,306,781 | A | * | 12/1981 | Mosely | 352/37 |
| 4,832,481 | A | * | 5/1989 | Beauviala | 352/5 |
| 5,369,433 | A | | 11/1994 | Baldwin | |
| 6,429,922 | B1 | * | 8/2002 | Fujita | 352/26 |
| 2003/0193556 | A1 | * | 10/2003 | Druzynski et al. | 347/239 |
| 2007/0171373 | A1 | * | 7/2007 | Bjerkestrand | 352/11 |

FOREIGN PATENT DOCUMENTS

| | | |
|---|---|---|
| EP | 0 544 090 A1 | 6/1993 |
| GB | 2 005 512 | 4/1979 |
| JP | 8-76290 | 3/1996 |
| JP | 8101452 | 4/1996 |
| WO | WO 98/44388 | 10/1998 |
| WO | WO 00/10054 | 2/2000 |

* cited by examiner

*Primary Examiner*—William C Dowling
(74) *Attorney, Agent, or Firm*—Finnegan, Henderson, Farabow, Garrett & Dunner, L.L.P.

(57) ABSTRACT

The invention regards a device for recording full picture frames onto a photosensitive material, comprising at least one light source, at least two full frame devices for modulating light from the light source, imaging optics for combining the modulated light from the light modulation devices and/or combining optics, and recording the modulated light onto the photosensitive material, thus exposing the photosensitive material frame by frame, a film transportation device adapted for exposing, section for section, sections of the photosensitive material to the modulated light. The invention also regards a device for simultaneous and synchronised recording of full picture frames and sound tracks onto a photosensitive material.

15 Claims, 8 Drawing Sheets

Figure 3c

| 1 | | 4 |
|---|---|---|
| | C | |
| A | D | E |
| 2 | F | 5 |
| B | G | H |
| 3 | I | 6 |

DEVICE FOR RECORDING FULL PICTURE FRAMES ONTO A PHOTOSENSITIVE MATERIAL

CROSS REFERENCE TO RELATED APPLICATIONS

This application is an national phase application based on PCT/NO2004/000346, filed Nov. 12, 2004, which claims the benefit of U.S. Provisional Application No. 60/519,264, filed on Nov. 13, 2003, and the priority of Norwegian Application No. 2003 5046, filed Nov. 13, 2003, the content of each of which is incorporated herein by reference in its entirety.

This invention concerns a device for simultaneous and synchronised recording of full picture frames and sound tracks onto a photosensitive material, The invention also concerns a device for recording full picture frames onto a photosensitive material by means of more than one device for light modulation.

The present invention includes a device for optical recording/printing of negative and/or positive full frame digital and/or analogue and/or computer generated images on a negative or positive motion picture (celluloid) film of any type or manufacture.

Motion pictures are composed of a number of picture frames shown one at a time to give the impression of movements. When recording the motion pictures, i.e. printing on film, one can divide the frames in the original motion picture into lines and write the frame on the film line by line.

In general we can say that most prior art technologies transfer frames in the motion picture to a celluloid film line by line as opposed to the inventive technology that prints on the celluloid film a full frame on each exposure.

GB A 2005512 shows a process and apparatus for transcribing a colour videodisc onto a cinematographic film. A colour television signal representing a series of interlaced images (i.e. only every second line of the original image is presented) is read on the video-disc, these images are reproduced on a television receiver, and the screen of this television receiver is filmed with a camera.

The greatest disadvantage of this prior art compared to the invention is time consumption and costs. Further the image quality is not as good as desired, due to limitations in the CRT (cathode ray tube).

U.S. Pat. No. 5,369,433 concerns an apparatus and method for recording a video signal on cinematographic film. A video signal is recorded on unexposed cinematographic film by shining light from a light source onto a deformable mirror device. The elements of this deformable mirror device are controlled in response to the video signal. Light is selectively reflected by the device onto an image plane containing the film such that the light reaching the film is representative of the video signal.

This publication deals with transference of video signals to cinematographic film. In video format pictures are represented by two interlaced "half" pictures which in combination gives one full picture. 50 such "half" pictures are shown per second, which in effect means that there are 25 whole pictures/sec to be transferred. In cinematographic film, 24 pictures are shown per second, and this difference in frequency must be compensated for. This publication shows use of different devices for transferring information contained in 25 pictures/second to cinematographic film. These devices are de-interlacing and integrating systems etc. The presence of such devices leads to an increase in the total costs and introduces possible error sources.

For showing the final cinematographic film in a cinema/movie theatre, sound tracks must be copied on to the final print film together with the images.

Films ready to be showed in a cinema, normally have several different sound formats recorded in different standard positions on the film. The different sound formats have different technical specifications as well as different ways of storing the sound information. The information may be an analogue or digital bitstream. The movie theatre will have at least one decoder for interpreting and playing the sound information.

The sound tracks are physically located on the side of the film, adjacent to the perforations. The different standard sound formats have standardised locations on the film. The most usual sound formats, which normally are recorded on a cinematographic film are Dolby Digital, DTS (Digital Theater Sound), traditional optical analogue tracks (Dolby stereo), and SDDS (Sony Dynamic Digital Sound).

The recording of sound tracks on the cinematographic film is performed by means of a separate device, recording the sound on a separate sound negative film. The recorded film negative and the sound negative are then combined together in a so called "film printer" where these two negatives are exposing a third film,—the positive print film,—i.e. the film copy shown in theatres. One example on this procedure is described in WO 0010054.

JP 08076290 describes a camera system which can record pictures and sound onto a photosensitive material for playing back on a TV. The picture recording is performed as a common camera, and the sound is processed before recording on the photosensitive media. This is a camera which is adapted for recording live events for later playback on a TV apparatus and cannot be used for transferring other kinds of full picture frame material to a photosensitive material, eg. film.

WO 0010054 discloses a video-to-film transfer system and process for exposing colour cinematographic film from a video source. The system uses a video/data projector which projects the images on a screen, and a film camera which records the images projected on the screen. The publication also discloses a method for recording sound. This system is complicated and has several optical elements which must be correctly aligned for the system to perform well. The video projector is a LCD-type projector. For recording sound, a separate sound negative is produced, which later is combined with the picture negative to produce a positive print which may be projected in a film theatre. This is an expensive and time-consuming procedure, and there has been a long felt need for more efficient methods.

In several countries world-wide there is a need to include sub-titles on the final released movie. Sub-titles are recorded on the final print film copy in a process separated from the film recording and printing. When the final positive print copy is ready it is run through a specialized device where the sub-titles are "etched" onto the film. This "etching" can be made by e.g. a laser beam. Again this is an expensive and time-consuming procedure, and there is a great potential for more efficient methods.

The object of the present invention is to provide a device for transference of digital and/or analogue motion pictures to a photosensitive material. More specifically, it is the object of the present invention to provide a device for recording full frame digital and/or analogue and/or computer generated images, frame by frame on an analogue film for motion pictures. It is also an object of the present invention to provide a device that additionally can record sound on the photosensitive material, preferably simultaneously to the recording of the images. It is a further objective of the present invention to record sub-titles directly onto the film in the same process and during the same time as images and sound is recorded.

The term "simultaneously" means in this description that the images and the sound are recorded during the same time period, i.e. in the same process. The sound recording may be performed in a location spaced from the image recording, and this means that the corresponding image (picture, sub-title) and sound will be recorded with a small time-shift in order to provide synchronisation, i.e. the sound is recorded on the film frame that contains the corresponding image. It is also possible that the image and sound is recorded as an integrated process, in which case there will be no time shift.

The expression "frame by frame" emphasises that the transference is done for each single frame in the source material, i.e. not line by line. This "source material" can be a High definition TV (HDTV) picture sequence (or any other digitally represented full frame images), a sequence of pictures scanned from a motion picture film/cinematographic film by means of a full frame digital scanner, a digitally created digital film (e,g, created on a computer), or any other digital full frame format. With "full frame" in this context it is meant a picture comprising all lines (and pixels) in each frame. This is not the case for TV/video pictures, which consists of two "half" pictures which must be transferred and combined to create a complete picture. The solution related to video/TV pictures needs complicated interpolation and de-interlacing devices for compensating the difference in number of pictures transferred by second, as mentioned above.

In other words one can say that by means of the invention, transference is achieved without dividing the frame into lines. Besides, the complete full frame is transferred, this makes de-interlacing and interpolation unnecessary.

In one aspect, the object of the invention is achieved by means of a device for simultaneous and synchronised recording of full picture frames and sound tracks onto a photosensitive material, which it comprises
at least one light source,
at least one full frame device for modulating light from the light source according to input image data,
imaging optics for imaging the modulated light onto the photosensitive material, thus exposing the photosensitive material frame by frame,
a film transportation device adapted for exposing, section for section, sections of the photosensitive material to the modulated light,
a sound recording device located adjacent to the film transportation device for recording the sound tracks on the photosensitive material simultaneously to the image recording,
a control/data processing system.

In one embodiment, the device according to the invention comprises a system for recording subtitles simultaneously to the image and sound recording.

In one embodiment the light source is a LED source.

In one embodiment, the recorded images are positive or negative and the photosensitive material may be positive or negative film.

In one embodiment, the device according to the invention comprises two or more devices for modulating light, the processing system is adapted for splitting the image data into a number of image data sub-sets, and the device further comprises combining optics for combining the modulated light from the light modulation devices.

In an embodiment, the device according to the invention comprises sensors for providing feedback to the control/data processing system for control of the device for modulating the light and/or the light source.

In another aspect the object of the invention is achieved by means of a method for simultaneous and synchronised recording of full picture frames and sound tracks onto a photosensitive material which comprises steps of illuminating a least one full frame device for modulating light, imaging the modulated light onto the photosensitive material according to input image data, thus exposing the photosensitive material frame by frame, transporting the photosensitive material for exposing, section for section, sections of the photosensitive material to the modulated light,
recording the sound tracks on the photosensitive material simultaneously to the image recording.

In one embodiment, the method according to the invention comprises the further step of recording subtitles simultaneously to the image and sound recording.

One embodiment of the method comprises the further steps of splitting the image data into a number of image data subsets, and combining the modulated light from the light modulation devices.

Another aspect of the invention provides a device for recording full picture frames onto a photosensitive material, comprising
at least one light source,
at least two full frame devices for modulating light from the light source according to input image data,
imaging optics and/or combining optics for combining the modulated light from the light modulation devices, and recording the modulated light onto the photosensitive material, thus exposing the photosensitive material frame by frame,
a film transportation device adapted for exposing, section for section, sections of the photosensitive material to the modulated light,
a control/data processing system adapted for splitting the image data into a number of image data sub-sets.

In one embodiment the device according comprises a device for recording subtitles simultaneously to the image and sound recording.

In one embodiment, the light source is a LED source.

In still one embodiment, the recorded images are positive or negative and the photosensitive material may be positive or negative film.

In one embodiment the device also comprises a sound recording device located adjacent to the film transportation device for recording the sound tracks on the photosensitive material simultaneously to the image recording, The device may also comprise sensors for providing feedback to the control/data processing system for control of the device for modulating the light and/or the light source.

The device according to the invention includes a digital head which comprises at least one light source, at least one device for modulating light and an imaging lens, a film transportation device, and a combined control and data processing system partly comprised in the digital head, comprising user interface, transport, image splitting, image formatting, subtitle recording system, image calibrating system and "graphical computer interface". The device further comprises a sound recording device. The device may also comprise a shutter device. The components are preferably fixed on a mechanical structure and are enclosed in a housing.

The photosensitive material, on which the picture frames are recorded, may be for example a celluloid film, photosensitive paper, or any other photosensitive material suited for carrying a representation of a motion picture film. In a preferred embodiment the photosensitive material is adapted for displaying motion pictures. Both the original motion picture to be transferred and the final image may either be positive or negative.

The light source(s) emits light into the optical path of the digital head. Between the light source and the light modulation device in the light path, a colour filter may be placed. This may be a rotating colour wheel, divided in sections of different colours, which passes light of the different colours sequentially (in series). The colours of the colour wheel will preferably be the three primary colours, red, green, and blue. Alternatively the light may pass through separate colour filters of different colours, for being transmitted to separate colour modulation devices, respectively. After being modulated, the light from the three light paths are combined for creation of the final image which is directed onto and exposes the photosensitive material. This creation of the final image for exposing the photosensitive material can be described as imaging onto the photosensitive material.

The light source can be any light source suitable for emitting light of the desired wavelengths. Examples of light sources are LED (Light Emitting Diode) light sources, either emitting white light for use in combination with colour filter(s), or comprising LEDs with different wavelengths to obtain the desired wavelength spectrum, and where the different LEDs may be controlled separately for colour modulation purposes.

The device(s) for modulating the light from the light source may e.g. be a DMD (digital micromirror device), as part of a DLP device (digital light processing), a transmissive LCD device or a reflective LCD device (e.g. D-ILA). The light modulating device/device for modulating light must be a digital fall frame device (i.e. able to display all picture lines at the same time). The light modulating device may be of a type which modulates all three primary colours (red; green, blue, (RGB)) or the device may comprise three light modulating units, each able to modulate one of the three primary colours. One preferred embodiment employs two or more light modulating devices, for modulating different sections of the picture. The modulated light from the light modulating devices is combined by combining and/or integrating optics before the light arrives at the photosensitive material, and the resulting combined image will still be transmitted as a full frame, but will have better resolution compared to embodiments with only one light modulation device. The resolution may be further increased by using a combination of more light modulation devices.

The combination of several light modulating devices can be done to adapt the image to a desired aspect ratio and/or resolution. For example two standard light modulator modules with aspect ratio 16:9 and 1920×1080 pixels can be combined to obtain a combined image with aspect ratio 1:1 and 2 k pixels×2 k pixels.

The digital head comprises also a control and data processing system containing electronics and software for processing input image data. The input image data may have any kind of displayable image format, digital or analogue, such as computer graphics format etc. Preferably the source material is HDTV or other full frame digitally represented film. The picture representation may be either a positive or a negative representation. The processing electronics and software may be adapted for processing both digital and analogue data, and comprises e.g. AD-converters for converting an analogue signal to a digital signal for further processing. The processing electronics/software further controls the light-modulating device according to known protocols/standards to give the correct modulation of light to be imaged onto the photosensitive material. The processing of the input image data preserves the representation of a motion picture in such a way that the number of frames per time unit in the original motion picture corresponds to the number of imaged frames per time unit. This provides a very efficient transference of the film, as there is no need for complicated de-interlacing and/or interpolation procedures. The imaged pictures may be either positive or negative according to the desired use of the product.

The control and data processing system may further control the sound recording device. The sound recording device receives start, stop and synchronization information. The synchronization information depends on the relative locations of the image and sound recording and provides for the time shift between the two recording processes to ensure that the sound are recorded on the corresponding image frame.

The control and data processing system may also be adapted for processing sub-title data and for controlling the light modulating devices to image the sub-titles as an overlay on the picture frame imaged onto the photosensitive material. The sub-title recording is thus an imaging process of the same type as the imaging/recording of the picture frames.

When using two or more light modulation devices, the input image data (pictures, subtitles) must be split in a number of image data sub-sets. The number of sub-sets depends on the number of light modulation devices. In the case of two light modulators, the image data are split in two sub-sets, three light modulators, in three, etc. Each image data sub-set comprises information corresponding to the actual fraction (½, ⅓ etc.) of the input image with the addition of some extra content of the input image in each sub-set. This extra content is present in at least two image data sub-sets and will provide overlap in the final imaged frame to provide a good transition zone, i.e. blending of the two images. The numbers of light modulation devices and the size of the overlap area can be varied, thus providing different effects according to needs for resolution, size, pixel visibility etc. When for example employing a large overlap area (<1 pixel shifted images), the effect of a visible pixel structure will be reduced. The processing electronics and/or software are adapted for performing the input image splitting and to format the image data sub-sets to provide good transition zones. Formatting techniques, are common known, and will not be described in detail in this specification. An example on such formatting is soft edge blending which is used in combination of a number of projecting devices to obtain wider display areas. This technique has, however, not earlier been used for film purposes.

At least one imaging lens with fixed or variable focal length for resizing the motion picture full frame to fit the photosensitive material, e.g. celluloid film may be located in the light path after the light modulation device(s). The variable focal length is achieved through combination of lenses where the positions of the lenses may be varied manually or automatically.

The light from the light source follows a light path through the colour filter, reflects off or is transmitted through the light modulation device, and is focused on the photosensitive material by the imaging lens(es), or through other imaging optics.

In the embodiment with two ore more light modulation devices, the light (images) from the light modulation devices may be combined before or after the imaging lens(es) or other optical components.

As mentioned earlier, the image data are received by the digital head through the graphical computer interface connected to the digital head. The graphical computer interface comprises a processor and data transfer lines, and advantageously a monitor device. The monitor device may be adapted to display the image data (frames) that are input to the digital head. The graphical computer interface may be adapted for connection to external equipment for transferal of and/or to display image data. The motion pictures that are transferred to the digital head may have a digital or an analogue representation, and the graphical computer interface is adapted for receiving and/or transferring both analogue and digital data.

A graphic user interface may additionally be connected to the digital head, to receive and display information relating to the progress of exposing images on the photosensitive material. This information may include calibration references, motion picture film references (e.g. film name, duration, format etc.), film length used, measured picture quality, estimated time left, alarms in case of broken film, etc.

The photosensitive material is located in a film transportation device. The film transportation device comprises rollers arranged with a distance to each other. The rollers form two magazines, one supply magazine for unexposed, and a second storage magazine for exposed photosensitive material, e.g. film. Their storage capacities may be e.g. 305, 610 or 1220 metres. The photosensitive material is transferred from one roller to the other, and thus defines a plane which coincides with a plane through the focal point/imaging point. The transportation device further comprises film guide locks for securing the photosensitive material in the right position, film gate, film aperture gate to allow the light to expose the photosensitive material, and film channel which represents the path of the photosensitive material. Control signals for the film transportation device are generated in the digital head.

For automatic control of exposure parameters such as brightness, colour saturation, uniformity, contrast etc. one or more sensor(s) will be placed in the optical path. These sensors provide values which are the basis for the control signals from the digital head to the light modulating device(s) and light source(s). If the detected values for e.g. density deviate from the expected/preferred values, the digital head transmits control signals to the light modulating device and/or the light source(s) to reduce or eliminate the deviation.

The sensor(s) may e.g. be located in the film gate (behind the photosensitive material). In this case, the transference process must be stopped at regular intervals for image control. Alternatively, a fraction of the light beam may be split off before it reaches the photosensitive material, and this fraction of light is lead onto the sensor. This alternative permits control during transference. The measurements may be done for each frame, for one frame in each scene in the film, or at any desired time. Using this sensor information, the image quality of the imaged film may be considerably improved.

Other sensors may also be included in the system and the sensor data fed to the digital head. Examples of such sensor data are film breakage (a sensor detecting the presence of a photosensitive material in the exposing area), film movement speed, length of exposed film, etc. This information may be transferred to the graphic user interface to be displayed to the user of the device.

The sound recording device is located adjacent to the film transportation device for recording the sound directly onto the photosensitive material. The transportation device may comprise an additional aperture to allow imaging or other recording of sound onto the photosensitive material. The sound recording device may be any suitable device that is adapted for recording the desired sound formats. Several commercially available sound recording devices exist (e.g. laser and traditional light modulation) which may be used.

The sound is recorded synchronised to the recording of the pictures and sub-titles onto the film, and this means that recording speed is the same for both pictures and sound. The synchronisation of the pictures, sub-titles and sound is monitored and controlled by the digital head.

The transferal to the photosensitive material may be performed using different methods. In the preferred method, performed using the system described above, the motion picture images and sub-titles are recorded frame by frame. The transportation of the photosensitive material is intermittent, pausing the movement until a whole frame has been exposed on the photosensitive material. The time period for pausing the movement may be a predetermined time period, or the transport of the photosensitive medium can continue when the sensor values satisfy reference values. The recording of the sound may be performed in a continuous movement of the photosensitive material. This can be achieved by locating the sound recording device adjacent to a part of the film path where the film transport is continuously, while the picture imaging is done at a variable bulging of the film in the path where the variable bulging enables intermittent transport of the film in that part.

The invention will now be described more in detail, by way of an example and with reference to the accompanying drawings.

FIG. 1 is a schematic view of the device according to the present invention.

FIGS. 2a and b shows two possible configuration of the optical path inside the digital head for a single light modulation device.

FIG. 3a-d show the principle for combining sub-images from two or more light modulation devices.

Figure 1:
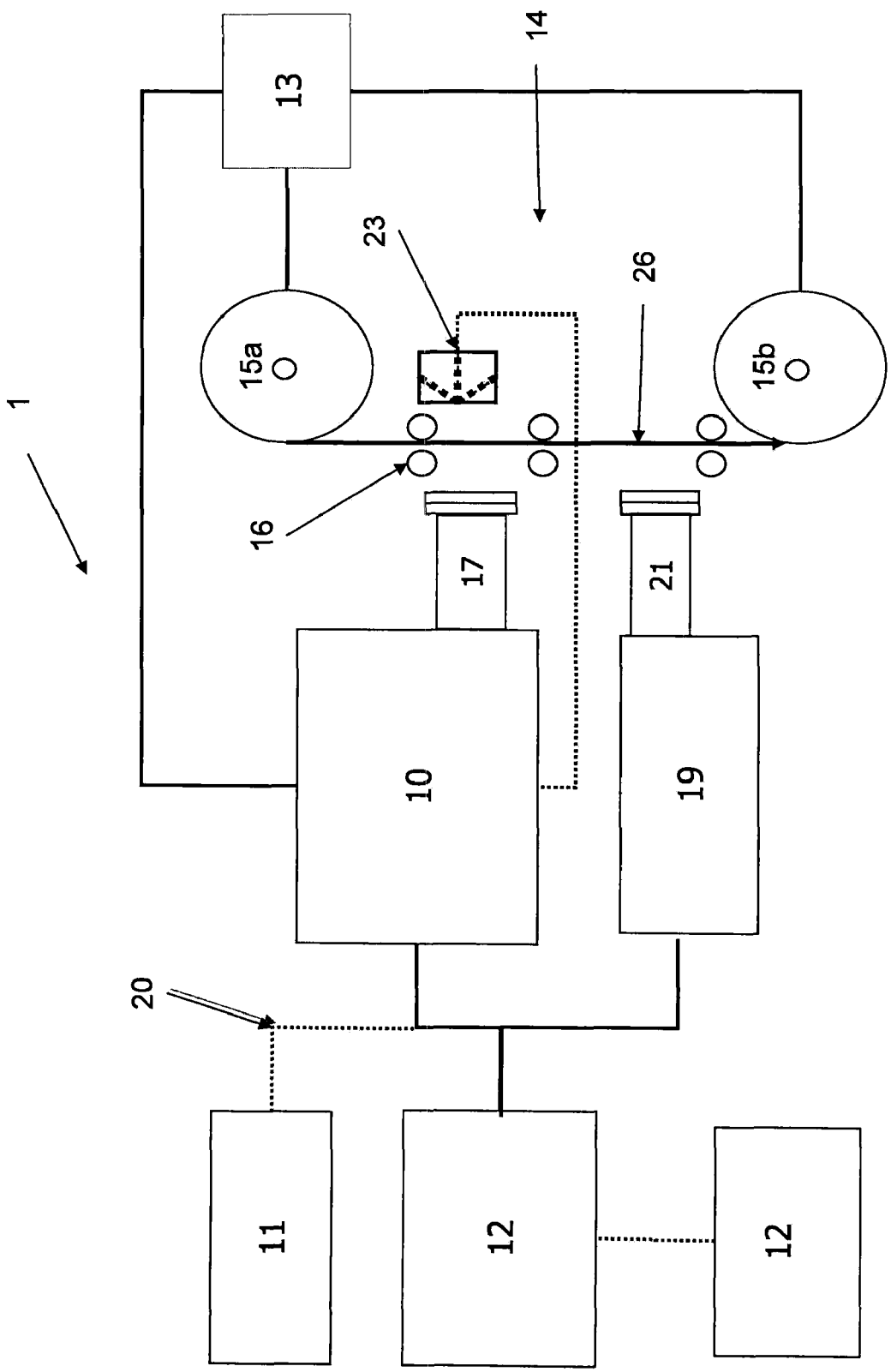

FIG. 1 gives an overview of the device according to the invention. The digital head 10 plays a central role in the device, receiving, processing and transmitting signals to/from the other components in the device. The digital head 10 additionally comprises essential optical components, which will be explained later in connection with FIGS. 2 and 3. The digital head, 10 is connected to the graphical computer interface 11 via a signal cable 20, for example a serial line, a Serial Digital Interface (SDI) or Digital Visual Interface (DVI). The motion picture image data is transferred from the graphical computer interface 11 to the digital head 10 and processed there. The data processing results in a set of instructions to the imaging optics of the digital head, instructions to a film transport control 13 and an optional shutter (not shown), and to a sub-title recording system. The optics of the digital head 10 transforms the processed image data to modulated light representing the image to be recorded on the photosensitive material 26. The photosensitive material is in one embodiment celluloid film.

An imaging lens or other imaging optics 17 is also included in the optical head. The imaging optics 17 images the light representing the image onto the film to expose the area of the film where the light images the picture. The imaging optics 17 preferably comprises high-quality optics with good optical properties, such as small aberrations, small reflections in the visible wavelength spectrum, uniform colour and brightness, etc.

A transport system 14 for the film is provided near the digital head exit and the imaging optics 17. The film 26 is wound on at least two roller devices 15a, 15b; one supply device 15a for providing the device with unexposed film and one temporary storage device 15b for winding the exposed film until the desired amount of pictures is recorded. The roller devices are preferably covered by a light tight housing.

The roller devices 15a, 15b are rotated by motor devices, for instance servo motors. The roller devices 15a, 15b are separated to release an amount of the film for exposure. Between the two roller devices 15a, 15b, the transport system 14 comprises film guide locks 16 for controlling the path of the film between the roller devices 15a, 15b. The transport system 14 further comprises a film aperture gate for allowing light to reach the film on a defined section of the film.

Adjacent to the film aperture gate, there are provided at least one image sensor 23. The image sensor(s) 23 detects the recorded image quality and transmits sensor information to the digital head 10. The image sensor(s) 23 may for example detect brightness, colour balance, colour saturation and contrast of the image. The sensor values for each property are compared to reference values stored in the digital head. If the difference is greater than a predetermined threshold value, the digital head sends corrected instructions to the imaging optics to achieve better recording performance.

A sound head 19 is located adjacent to the film transport system 14. The sound head is a commercially available device adapted to record sound in one or more desired sound formats. The sound head 19 is connected to, or comprises, optical or other components to direct the sound track/image to the desired sections of the film 26. The sound head 19 is connected to the digital head 10 and the user interface 12 for receiving control signals and input data.

A film transport control 13 controls the advance of the film in the transport system 14 by controlling the motors of the roller devices 15a, 15b. The film transport control receives synchronisation information from the digital head and rotates the roller devices according to this. The synchronisation information from the digital head may comprise start and stop signals, interval times, film speed, etc, and assures that the correct section of the film is exposed for each picture.

The digital head is also connected to a user interface 12. The user interface 12 displays information regarding the recording progress, such as the amount of film left in the supply device 15a, time left of the recording, the image quality, motion picture references (name, duration, format, etc.), and alarms when errors occur because of broken film or other reasons. This information is based on the sensor information contained in the digital head 10.

Figure 2A:
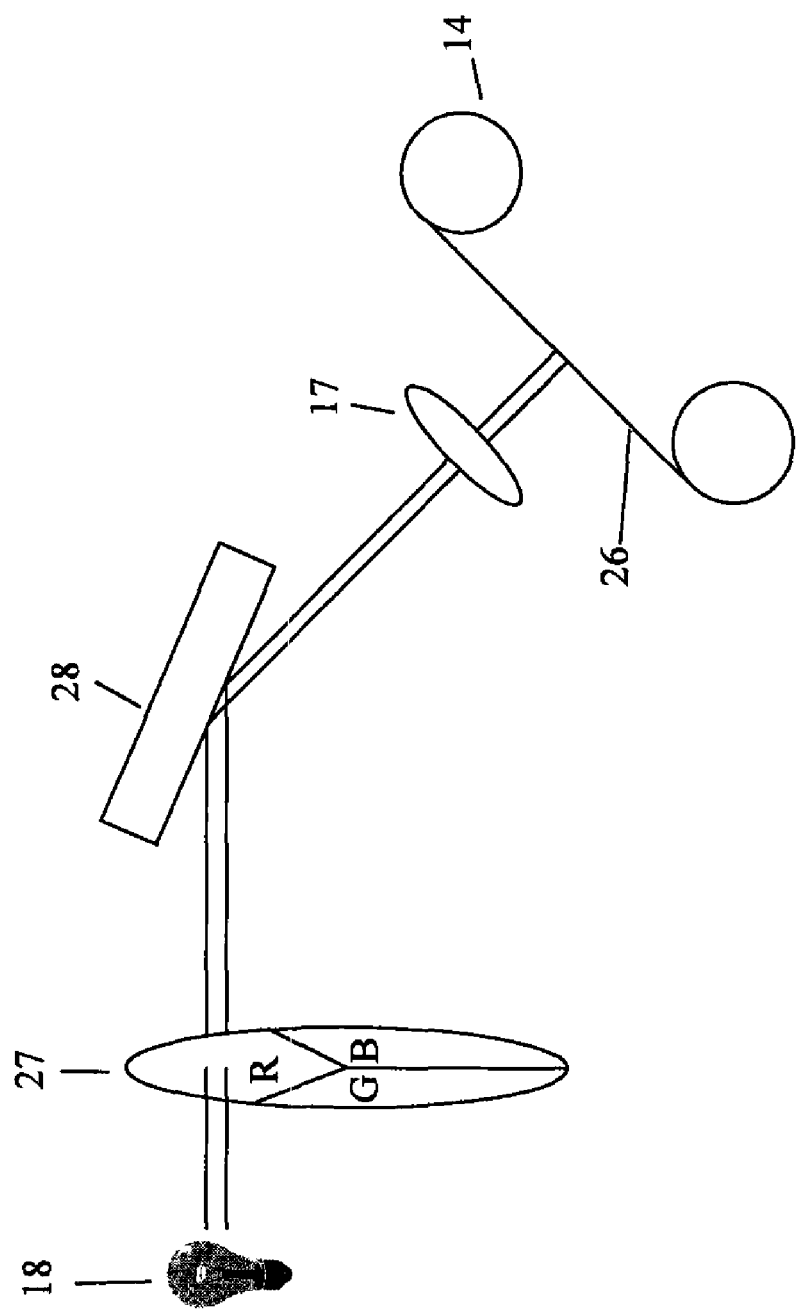

FIG. 2a is a diagram of one configuration of the optical components of the digital head. A light source 18 emits radiation in the visible wavelength range. The light source may be any light source with the desired wavelength emitting properties, e.g. having good emitting properties in the visible light spectrum and having sufficient brightness to expose the film. The light source is preferably a LED light source, where the LEDs are chosen to obtain a wavelength spectrum of the source that corresponds to the sensitivity of the photosensitive medium. The light source may alternatively be an off-the shelf incandescent lamp. One example of a suitable LED source is being developed of Visitech and is described in Norwegian Patent Application no. NO 20033133 which is hereby incorporated by reference.

A colour wheel 27 placed in the light path filters out the desired colours sequentially when rotating at a predetermined speed. The coloured light is modulated by one single light modulation device 28 and is transmitted to the imaging lens 17. The imaging lens images and thus records the modulated light onto the film 26. When using a LED light source, there will normally not be any need for a colour wheel as the colour spectrum of the LED light sources normally can be controlled.

Figure 2B:
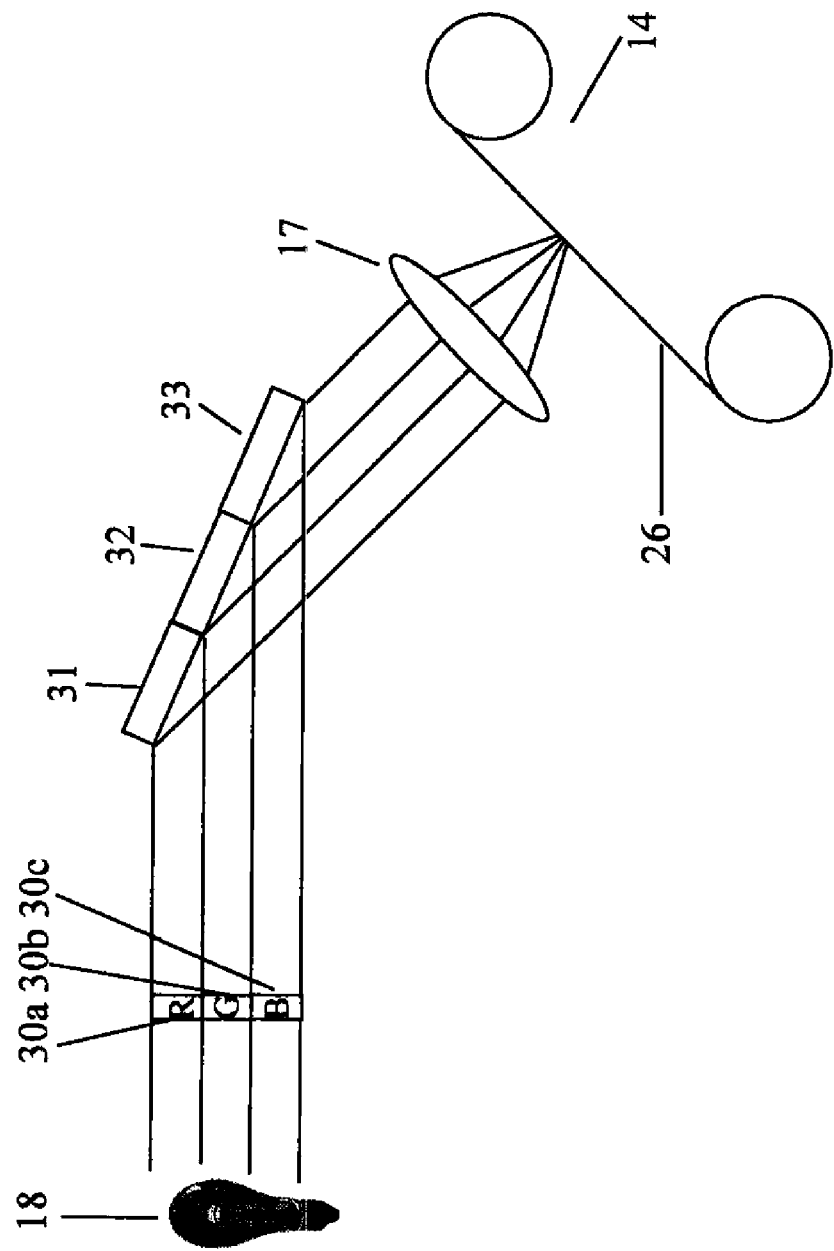

FIG. 2b is a diagram of another configuration of the optical components of the digital head. The light source 18 is the same as in FIG. 2, but in this case, the light beam passes through three separate colour filters 30a-c. The three coloured light beams are modulated by three separate light modulation devices 31,32,33, respectively and are collected by the lens 17 to expose the film 26.

Figure 3B:
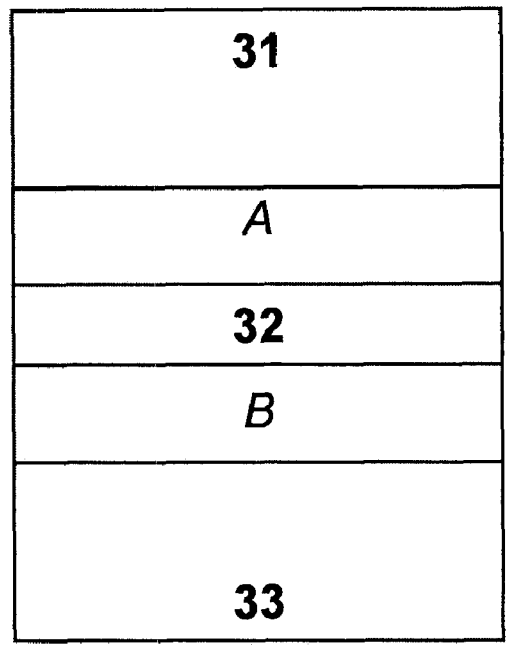
Figure 3A:
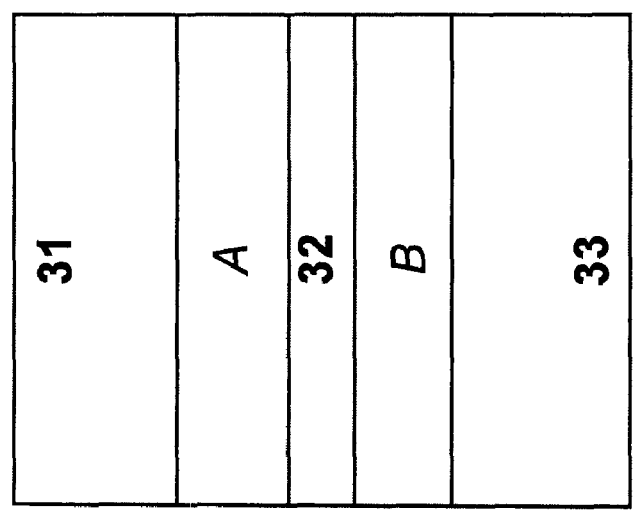
Figure 3C:
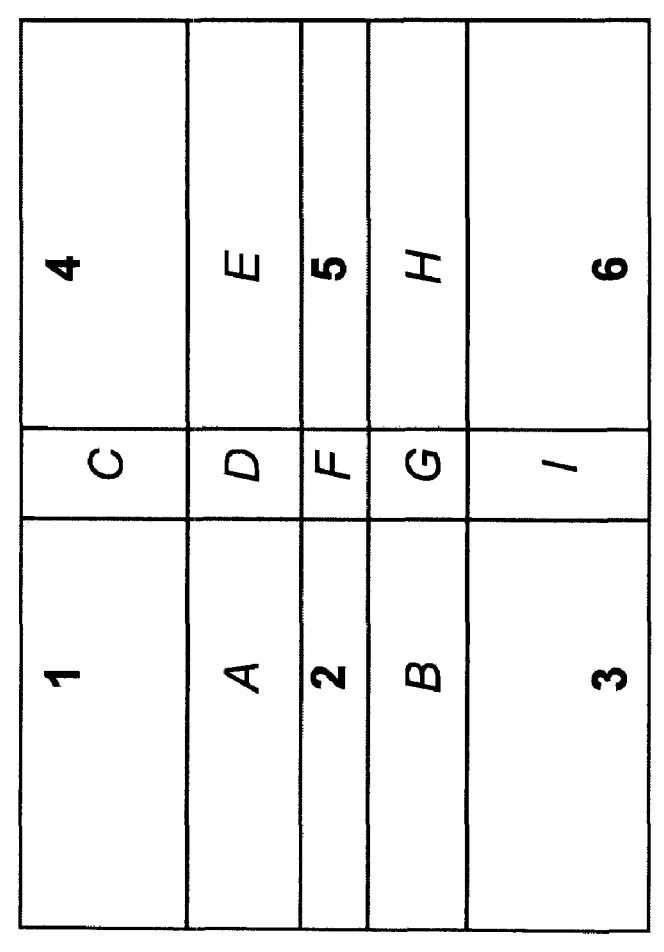

FIG. 3a-c show the principle for combining sub-images from two or more light modulation devices. In FIG. 3a and 3b three light modulation devices 31, 32, 33, for example DMD's, are used. The images from the three light modulation devices are situated side by side with some overlap within the frame. The overlap areas are noted as A and B. FIG. 3c illustrates how 6 light modulation devices may be used for generation of a larger display area, and thus even better resolution when imaged on a small film frame. The sub-images from the six light modulation devices are overlaid in all adjacent image sides, thus providing nine overlap areas A-I.

Figure 3D:
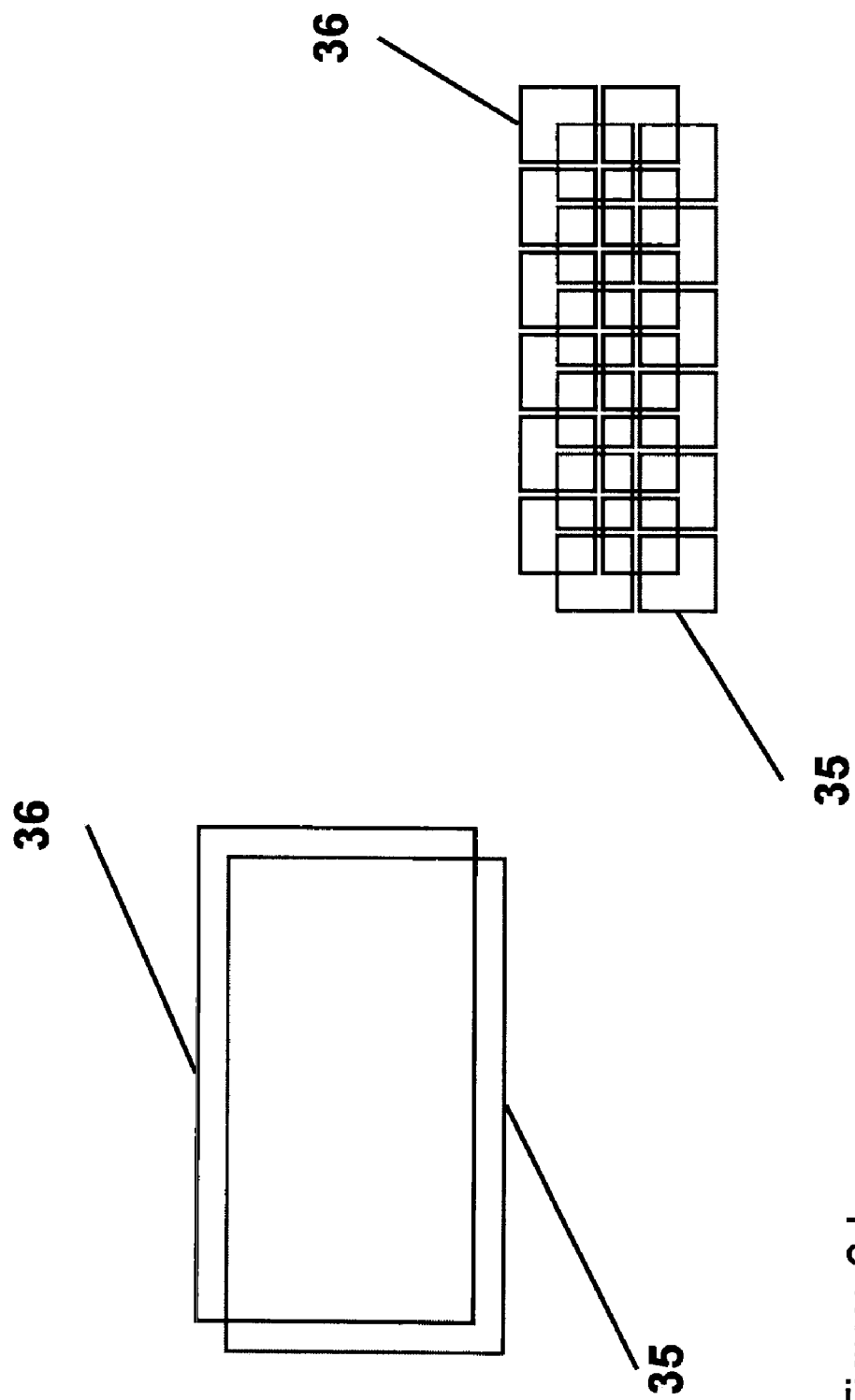

FIG. 3d shows another embodiment for combination of sub-images from two or more light modulation devices. In this embodiment, two light modulation devices 35, 36 are used; but the number of light modulation devices can be chosen according to the specific image requirements. The images from the light modulation devices are overlapping more than in the embodiments in FIG. 3a-c. The images are shifted approximately a half pixel in parallel and diagonal with respect to each other. This will have the effect of reducing the potential effect of a visible pixel structure in addition to increasing the resolution.

Figure 4:
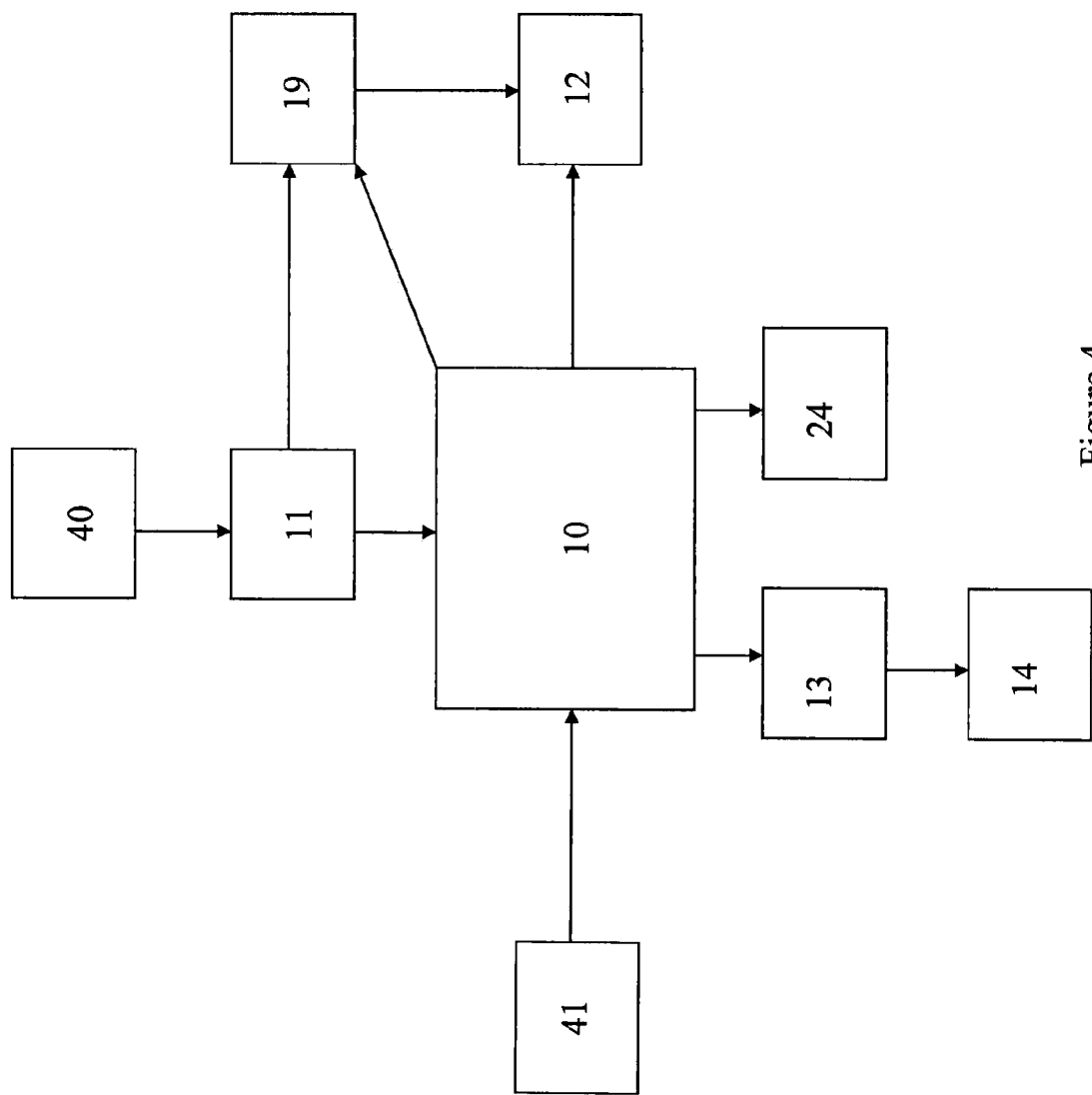
FIG. 4 shows a block diagram illustrating the signal communication in the device, according to the invention.

FIG. 4 illustrates the signal communications in the device according to the invention. The digital head 10 plays a central role in controlling the functions of the device. The digital head 10 receives image data from the graphical computer interface 11. The graphical computer interface 11 may be connected to an external data source 40. This may be an external computer, disk drive, or other source of image data. The digital head receives sensor data from sensor devices 41 and uses this in processing the image data. At least some of the sensor data are displayed on the user interface 12. The digital head transmits control signals to the film transportation control 13 and to the shutter, also based on the image data processing and the sensor data. The film transportation control transmits control signals to the film transport system.

The sound head 19 receives sound data from the graphical computer interface 11 and control signals from the digital head 10. The sound head may 19 also be connected to the user interface 12 for monitoring the sound recording process or other variables of interest.

Figure 5:
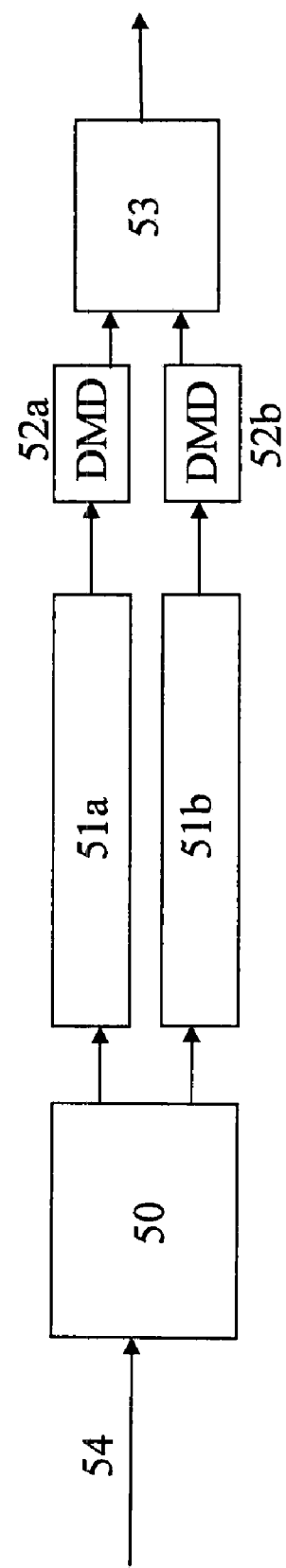
FIG. 5 illustrates the principle of dividing the original input image/picture data for use of two light modulation devices.

FIG. 5 shows one process in the device according to the invention for use of two light modulation devices, e.g. DMD's. The input image data 54 is fed into an image splitter 50. In the image splitter 50, the image data is divided into two image data sub-sets. The two image data sub-sets contain a little more than half the image data, ie. some of the data are common for the two pictures. The common data should be data corresponding to the edge-area of the sub-images, and will constitute the transition zone between the two sub-images after they have been combined. The two image data sub-sets are formatted in formatting units 51a and 51b, respectively. The formatting includes soft edge blending and other techniques to prepare the sub-images for being combined before exposing the photosensitive material. After formatting, the image data sub-sets are transferred to the DMDs 52a and 52b. The DMD's receives light from at least one light source and modulates the light to provide two sub-images. The two sub images are combined in combinating/integrating optics unit 53 and the final image is imaged onto the photosensitive material.

The invention claimed is:

1. A device for simultaneous and synchronised recording of full picture frames and sound tracks onto a photosensitive material, comprising:
   at least one light source;
   at least one full frame device for modulating light from the light source according to input image data;
   imaging optics for imaging the modulated light onto a photosensitive material, thus exposing the photosensitive material frame by frame;
   a film transportation device adapted for exposing, section for section, sections of the photosensitive material to the modulated light;
   a sound recording device located adjacent to the film transportation device for recording sound tracks on the photosensitive material simultaneously to the image recording; and
   a control/data processing system for controlling the at least one full frame device for modulating light and the sound recording device and providing synchronization information to the sound recording device.

2. The device according to claim 1, wherein it comprises a system for recording subtitles simultaneously to the image and sound recording.

3. The device according to claim 1, wherein the light source is a LED source.

4. The device according to claim 1, wherein the recorded images are positive or negative and the photosensitive material may be positive or negative film.

5. The device according to claim 1, wherein it comprises two or more devices for modulating light, the processing system is adapted for splitting the image data into a number of image data sub-sets, and that the device further comprises combining optics for combining the modulated light from the light modulation devices.

6. The device according to claim 1, wherein it comprises sensors for providing feedback to the control/data processing system for control of the at least one full frame device for modulating light and/or the light source.

7. A method for simultaneous and synchronised recording of full picture frames and sound tracks onto a photosensitive material, comprising the steps of illuminating a least one full frame device for modulating light, imaging the modulated light onto a photosensitive material according to input image data, thus exposing the photosensitive material frame by frame, transporting the photosensitive material for exposing, section for section, sections of the photosensitive material to the modulated light, recording sound tracks on the photosensitive material simultaneously to the image recording with a sound recording device and, controlling the at least one full frame device for modulating light and the sound recording device, and providing synchronization information to the sound recording device.

8. The method according to claim 7, including the further step of recording subtitles simultaneously to the image and sound recording.

9. The method according to claim 7, including the further step of splitting the image data into a number of image data sub-sets, and combining the modulated light from light modulation devices.

10. A device for recording full picture frames onto a photosensitive material, comprising:
    at least one light source;
    at least two full frame device for modulating light from the light source according to input image data;
    imaging optics and/or combining optics for combining the modulated light from the light modulation devices, and recording the modulated light onto the photosensitive material, thus exposing the photosensitive material frame by frame;
    a film transportation device adapted for exposing, section for section, sections of the photosensitive material to the modulated light; and
    a control/data processing system adapted for splitting the image data into a number of image data sub-sets.

11. The device according to claim 10, wherein it comprises a device for recording subtitles simultaneously to the image and sound recording.

12. The device according to claim 10, wherein the light source is a LED source.

13. The device according to claim 10, wherein the recorded images are positive or negative and the photosensitive material may be positive or negative film.

14. The device according to claim 10, wherein it also comprises a sound recording device located adjacent to the film transportation device for recording sound tracks on the photosensitive material simultaneously to the image recording.

15. The device according to claim 10, wherein it comprises sensors for providing feedback to the control/data processing system for control of the devices for modulating the light and/or the light source.

* * * * *